Figure 1:
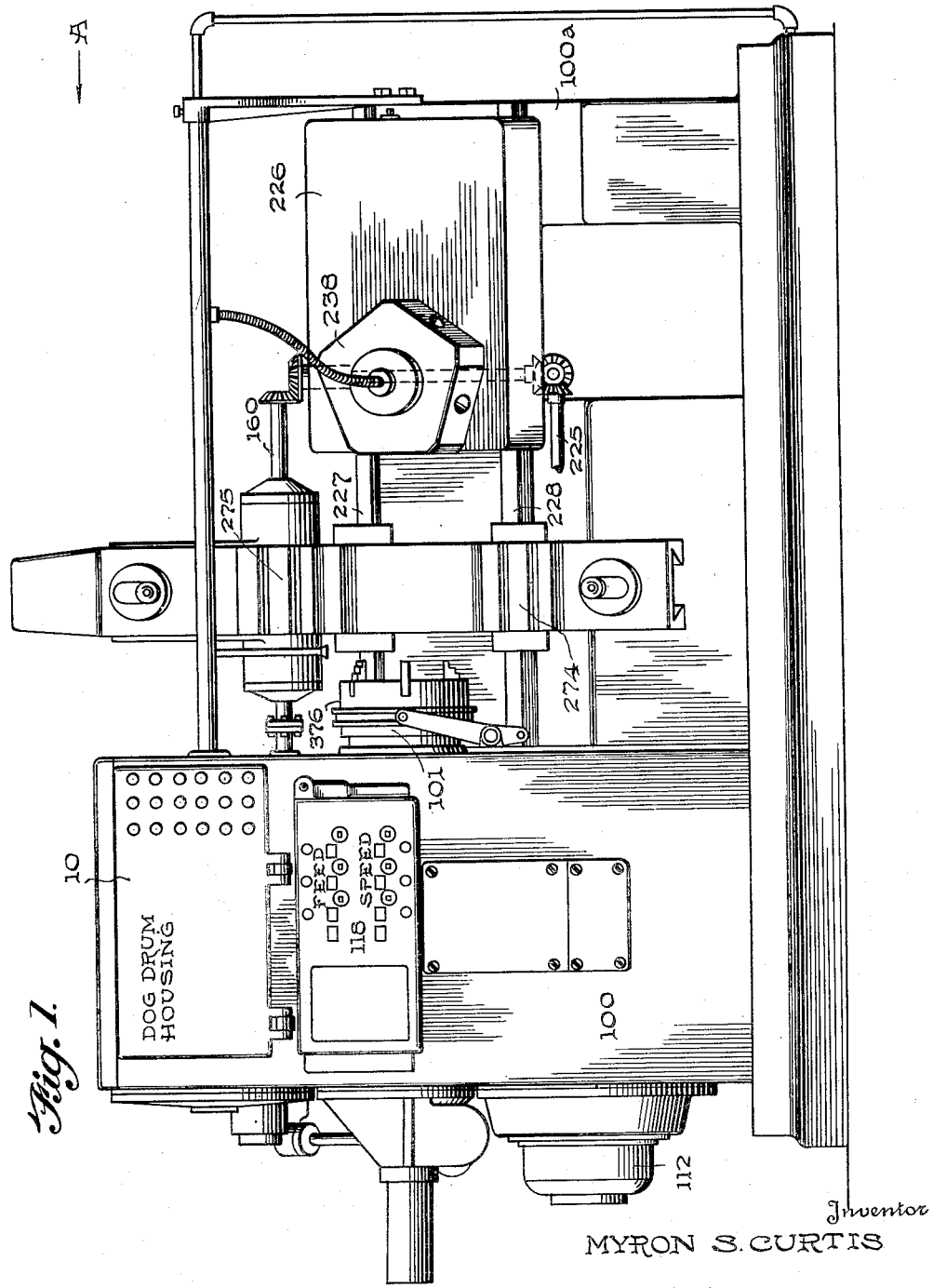

Jan. 25, 1944.　　　　　M. S. CURTIS　　　　　2,339,839
MACHINE TOOL
Original Filed June 8, 1938　　3 Sheets-Sheet 1

Inventor
MYRON S. CURTIS
By [signature]
Attorney

Jan. 25, 1944.  M. S. CURTIS  2,339,839
MACHINE TOOL
Original Filed June 8, 1938  3 Sheets-Sheet 3

Inventor
MYRON S. CURTIS,
By
Attorney

Patented Jan. 25, 1944

2,339,839

UNITED STATES PATENT OFFICE 2,339,839

MACHINE TOOL

Myron S. Curtis, Pawtucket, R. I., assignor to Potter & Johnston Machine Company, Pawtucket, R. I., a corporation of Rhode Island Original application June 8, 1938, Serial No. 212,565, now Patent No. 2,255,739, dated September 9, 1941. Divided and this application August 26, 1941, Serial No. 408,380

8 Claims. (Cl. 200—33)

The present invention broadly relates to machine tools and is more particularly concerned with the construction and mounting of the control dog drum usually employed in such machine tools for controlling the automatic operation of the slide or slides, of the spindle, of the turret and of other parts, and is a division of my co-pending allowed application, Serial No. 212,565, filed June 8, 1938, now Patent No. 2,255,739, granted September 9, 1941.

In machine tools of the automatic type, control dog drums have been employed and usually include dogs mounted on the outer surface of the drum for contacting and actuating levers or arms which in turn control the operation of various parts of the machine.

These dogs, once set up upon the drum, may be used for any one specimen of work, but when another specimen is to be produced the dogs must be re-set up in order that the machine will perform the necessary operations to produce such specimen.

The present invention has for its object the provision of a comparatively light dog drum insertable and removable from the dog drum housing of the machine and having the dogs arranged on the interior surface of the drum, but adjustable from its exterior surface, to engage any desired switch of a plurality of electrical contact switches mounted within and longitudinally of the drum, the contact switches controlling electrical circuits which in turn control the operations of the machine.

A further object of the invention is the disposition of the contact switches so that when the dog drum is removed the switches are readily accessible for adjustment, renewal or repair through a wall opening in the casing housing, and through which the switch support bar and member may be removed or replaced as a unit.

A still further object of the invention, and which is an extension of the above objects, is to produce such a novel construction as is economical, allowing simple and easy removal of the dog drums from the machine and the saving of the time necessary for setting up the dogs on the drum when the specimens to be worked in the machine are changed by simply changing pre-set up dog drums.

With the above and other objects in view, as will appear as the specification proceeds, the invention is all that is shown and described and particularly pointed out in the appended claims.

Figure 2:
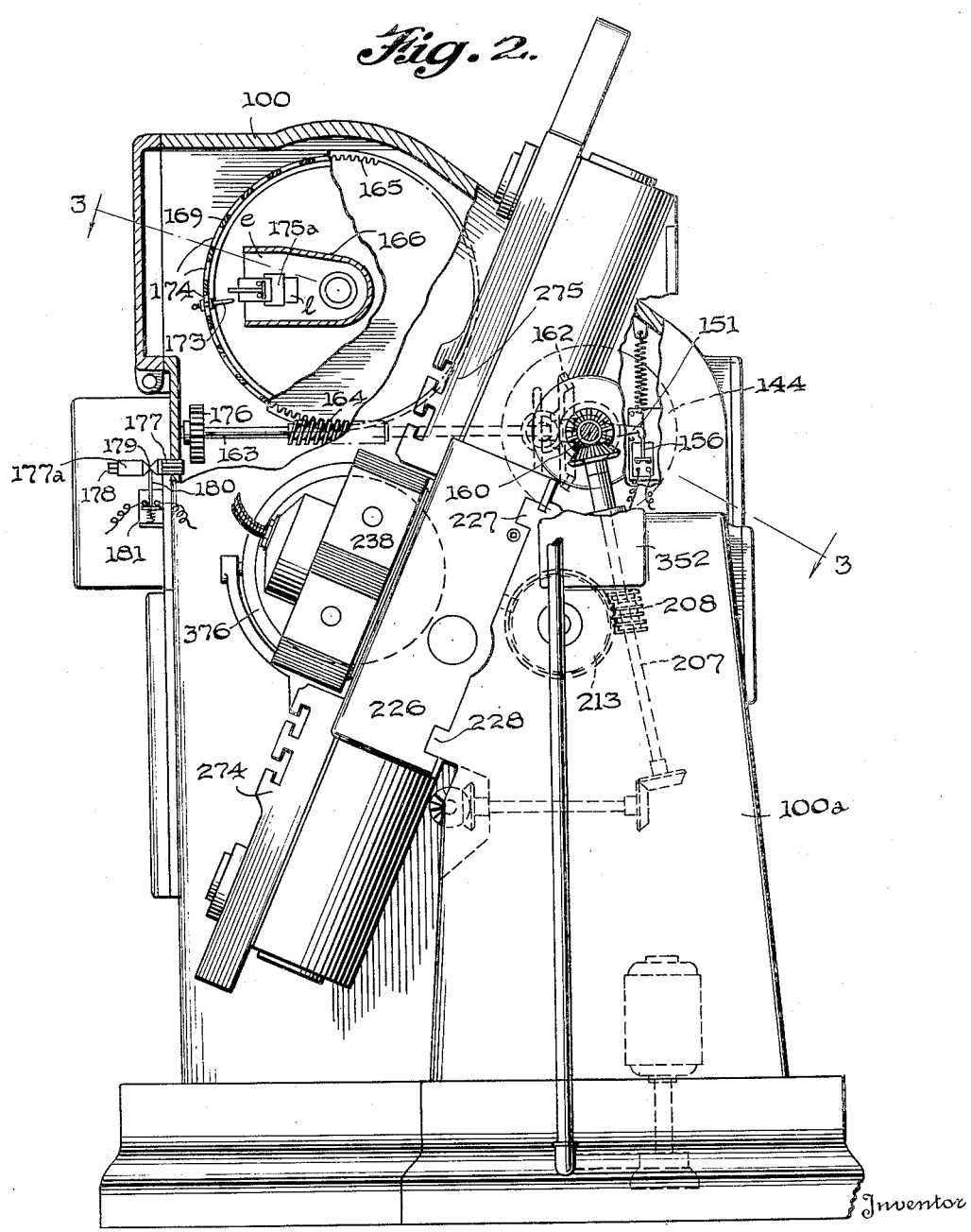
Figure 3:
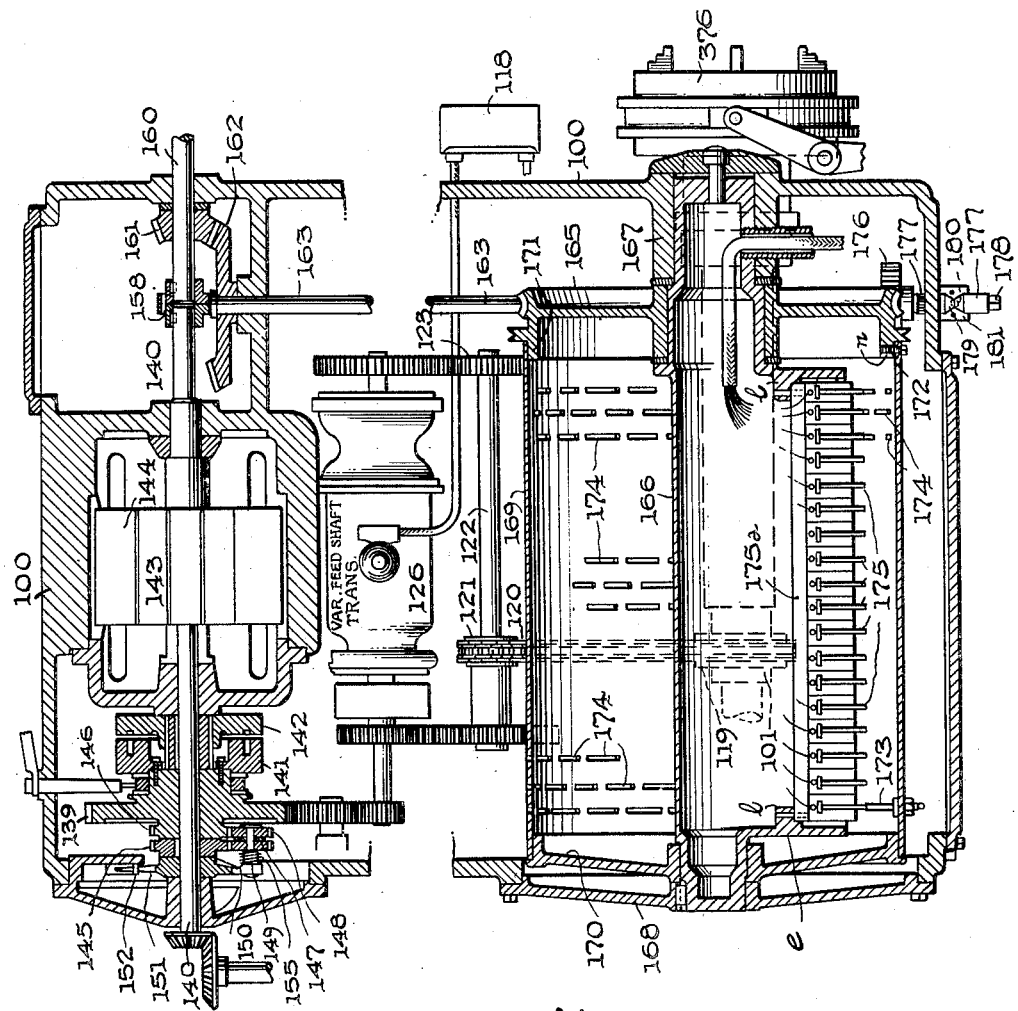

Referring in detail to the drawings which show the preferred embodiment of the invention as at present devised:

Figure 1 is a front elevation of a turret lathe with which the present invention may be employed, as an example;

Figure 2 is an end view of the machine tool shown in Figure 1 looking in the direction of the arrow A from the turret end thereof and with part broken away to show the disposition and construction of the drum, various parts shown in Figure 1 being removed for the purpose of clarity; and Figure 3 is a sectional view through the dog drum casing and taken substantially on line 3—3 of Figure 2 illustrating a portion of the feed shaft actuating mechanism and from which feed shaft the dog drum is operated.

Throughout the specification and drawings, like characters of reference designate like and corresponding parts.

The machine tool shown in Figure 1 is an automatic turret lathe, its operation being controlled electrically as disclosed in said co-pending application. A spindle 101 is mounted in the head stock of the machine and has on its outer end a chuck 376, of a well known type, for holding the work or specimen to be operated upon in cooperative relation with the turret slide 226 mounted, for to and fro movement with respect to the chuck end of the spindle, on ways 227 and 228.

The spindle is driven by an electrical motor 112 mounted in the head stock casing 100 through a mechanism shown particularly in Figure 10 of my co-pending application, aforesaid, and which includes an infinitely variable speed changing device controlled by a pre-selector mechanism 118.

The turret slide 226 and the cross slides 274 and 275 are actuated from a feed shaft 160 which is driven from the spindle 101. To this end, as indicated in Figure 3, a chain 120 passing over a sprocket 119 on the spindle 101 drives a shaft 122 which in turn drives the gear 139 through a variable feed transmission device 126, also controlled by the pre-selector 118. The gear 139 runs loosely on the shaft 140 but is fastened to the magnet 141 of a magnetic clutch. Keyed to the shaft 140 is an armature 142 of the magnetic clutch so that, when the magnet is de-energized, gear 139 and magnet 141 will revolve idly on the shaft 140. Also keyed to shaft 140 is the rotor 143 of an electric motor whose field 144 is fixed to the head stock housing 100 so that when motor 144 is energized shaft 140 is rotated at a high constant speed. When magnet 141 of the clutch is energized and motor 144 is de-energized, shaft 140 is driven by and in synchronism with the spindle 101 for doing work. When clutch magnet 141 is de-energized and motor 144 is energized, shaft 140 is driven at a high constant speed for idle movements of the turret slide 226 and of the cross slides, but when both are de-energized shaft 140 remains stationary. If shaft 140 is running at a high speed and gear 139 at a comparatively low speed, there would be a severe shock upon the engagement of clutch 141 due to the momentum of shaft 140. Therefore, a differential switch means 156 (Fig. 2) are provided for preventing the energizing of magnet 141 except when shaft 140 and gear 139 are running approximately at the same speed, as described in my aforesaid co-pending application.

A shear pin coupling 158 has one-half thereof keyed to shaft 140 and the other half of the coupling keyed to feed shaft 160 whereby the latter is driven.

The dog drum 169 which controls all of the automatic operations in the machine is actuated from the feed shaft 160 by means of a bevelled pinion 161 keyed thereon and meshing with the bevelled gear 162 keyed on shaft 163 having a worm 164 (Fig. 2) thereon meshing with the worm gear 165 which forms an end support for the control drum 169. This worm gear 165 is rotatably mounted on an electric switch carrier 166, which is preferably tubular to encase the electrical conductor as will be later apparent. The carrier 166 is fixed at one end in the head-stock housing 100 by hub 167 and at its other end is supported by and keyed to plate 168 removably secured to head-stock housing 100. The perforated sheet metal drum 169 has one end adapted to slip over a rabbet 171 of worm gear 165 and held thereon and driven by screw 172 engaging in a notch n in the gear 165 while at its other end, adjacent the removable plate 168, is an internal spider 170 rotatably mounted on the carrier 166, whereby the drum 169 will rotate about the fixed carrier 166.

Dogs 173 may be inserted through and fastened in the elongated slots 174 in drum 169 and when so inserted act upon switches 175, which are held in carrier 166, as the drum is rotated. The elongated slots 174 may extend in rows circumferentially of the drum 169, each slot in a row being spaced from the other and each being staggered with respect to the slots in adjacent rows along the whole length of the carrier 166. The ratio of gearing between shaft 160 and drum 169 is such that drum 169 makes one revolution for one cycle of the machine, and through dogs 173 and switches 175 control automatically the various functions of the machine in a way described in my aforesaid co-pending application.

With previous types of control drums, where the dogs are fastened on the outside and where the elements to be acted on by the dogs are also on the outside of the drum, adjustment of these dogs, particularly if a fine adjustment is required, becomes difficult due to the fact that the controlled element is between the operator and the dog. In the present construction, with the controlled elements inside the drum, there is nothing between the operator and the dog, and very fine adjustments can be made with ease.

It may be also noted, that by removing plate 168 and loosening screw 172, drum 169 and its attached plate 170 may be completely removed from the machine without disturbing any of the positions of the dogs. This is especially advantageous in the case of a complicated setup which must be repeated, because the drum 169 complete with its located dogs 173 may be stored intact for each setup, it then being only necessary to re-installed the drum, thus eliminating the necessity for readjustment of a number of dogs.

The switches 175 are mounted on a bar 175a which extends longitudinally of the switch carrier 166 and which latter has a laterally projecting enlargement e extending from one side thereof toward the front of the machine for a distance, but spaced from the inner surface of the control drum. This enlargement is open on its face opposite the drum so as to form a protecting shield or hood into which the switch supporting bar 175a is disposed and removably fastened to abutments or lugs l within the enlargement e. Thus, when the drum has been removed as above explained, the switches are accessible for adjustment, repair or removal or the entire bar 175a, with all the switches thereon, may be removed and reinserted as a unit through a panel doorway 10 in the head-stock casing opposite the control drum.

It may be desirable to rotate feed shaft 160 by hand for obvious purposes, and to this end is provided a gear 176 keyed to shaft 163, and therefore directly connected with shaft 160 (Figures 2 and 3). A pinion 177 (see Figs. 2 and 3) is fast on a slidable shaft 177a, which has a squared end 178 to receive a wrench or crank handle, and may be pushed into mesh with gear 176 so that gear 162, and thereby shaft 160, may be rotated by pinion 177. When pinion 177 is thus placed in mesh with gear 176 a cam surface 179 on shaft 177a pushes rod 180 of switch 181 (Fig. 3) to open the latter and to prevent any power operation of shaft 160 while the pinion 177 is engaged with gear 176, switch 181 being biased to closed position.

Having thus described the invention and the manner in which the same is performed, it is to be understood that the exact construction, combination and arrangement of parts may be modified and varied within the scope of the appended claims.

What is claimed is:

1. In a machine tool, a dog drum construction for controlling the automatic operations of the machine and which includes an elongated stationary member having a gear rotatably mounted thereon, a bearing for one end of the member, a hollow cylindrical drum rotatable about said member and having a bearing at one end portion thereof to slidably receive said member, whereby said drum is movable into and out of operative position, and means at the other end of the drum for making a detachable drive connection with said gear when the drum is moved longitudinally of the member into operative position.

2. In a machine tool, a dog drum for controlling the automatic operations of the machine as set forth in claim 1, wherein the end of the drum which makes driving connection with the gear fits into a rabbet on the side of the gear where a sliding projection establishes the driving connection between the drum and gear; and wherein the bearing for the other end of the drum is removable therefrom.

3. In a machine tool, a dog drum construction for controlling the automatic operations of the machine and which includes a tubular elongated stationary member providing an axis upon which the dog drum may rotate and a carrier for a plurality of switches; said dog drum being movable longitudinally of said tubular member to allow the dog drum to be moved into and from operative position, adjustable dogs mounted on the interior surface of the drum, a longitudinal slot provided in the tubular member, and a plurality of electrical switches mounted within the tubular member and having operable portions extending through said slot to be engaged selectively by said dogs when the drum is rotated, the electrical connections to said switches being extendable through said hollow tubular member and said switches being accessible through said slot in the tubular member when the dog drum is removed.

4. In a machine tool having movable parts with interrelated functions, a stationary support mounted on the machine frame, control elements stationarily mounted on said stationary support for controlling the functions of the machine, a rotatable element mounted on said support and driven by at least one of said movable parts in synchronism with the operations to be controlled, a hollow cylindrical drum connected to said rotatable element and driven thereby and surrounding said stationary support, and a plurality of dogs adjustable from the exterior surface of the drum and protruding inside said drum for actuating said control elements, said drum being removably secured to said rotatable element and removable from said support without disturbing the control elements on said support.

5. In a machine tool, a dog drum construction for controlling the automatic operations of the machine and which includes an elongated stationary member having a drum actuator rotatably mounted thereon, a hollow cylindrical drum rotatable about said member and having a bearing at one end portion thereof to slidably receive one end of said member, whereby said drum is movable into and out of operative position, and means at the other end of the drum for making a detachable drive and supporting connection with said actuator when the drum is moved longitudinally of the member into operative position and conversely.

6. In a machine tool, a dog drum construction for controlling the automatic operations of the machine and which includes a tubular elongated stationary member providing an axis upon which the dog drum may rotate and a carrier for a plurality of switches; adjustment dogs mounted on the interior surface of the drum, a plurality of electrical switches supported by the tubular member and having operable portions to be engaged by said dogs when the drum is rotated, and electrical connections to said switches extending through said hollow tubular member.

7. In a machine tool, a dog drum for controlling the automatic operations of the machine comprising an elongated stationary drum-support mounted at one end to the machine and provided at the other end with an external bearing element, a hollow cylindrical dog drum surrounding said support and rotatably mounted thereon by means of an internal bearing element at one end of the drum engaging said external bearing element and slidable onto the latter for placement of the drum around the stationary drum support, driving means for the drum, and means carried by the drum for operatively connecting the drum with the driving means upon placement of the drum around the support.

8. In a machine tool, a dog drum for controlling the automatic operations of the machine, comprising an elongated stationary support connected at one end to a stationary portion of the machine, a rotatable drum actuator rotatably mounted on the support near the end connected to the machine, a dog drum having one end opened to permit said drum to receive the other end of said support to surround the latter and having said end removably mounted on the actuator, control elements mounted on the stationary support, and a plurality of dogs projecting from the interior surface of the drum for operable engagement with the control elements.

MYRON S. CURTIS.